Nov. 21, 1967  W. W. BARTON ET AL  3,353,258

BOWLING PIN

Filed Feb. 17, 1964  4 Sheets-Sheet 1

WILLIAM W. BARTON
MILTON B. HOLLANDER
JAMES A. BOLTON
INVENTORS.

BY Arthur J Plantamura
ATTORNEY.

Nov. 21, 1967  W. W. BARTON ET AL  3,353,258
BOWLING PIN
Filed Feb. 17, 1964  4 Sheets-Sheet 2

WILLIAM W. BARTON
MILTON B. HOLLANDER
JAMES A. BOLTON
    INVENTORS.

BY  Arthur J. Plantamura
        ATTORNEY.

Nov. 21, 1967 W. W. BARTON ET AL 3,353,258
BOWLING PIN
Filed Feb. 17, 1964 4 Sheets-Sheet 3

WILLIAM W. BARTON
MILTON B. HOLLANDER
JAMES A. BOLTON
INVENTORS.

BY Arthur J. Plantamura
ATTORNEY.

Nov. 21, 1967  W. W. BARTON ET AL  3,353,258
BOWLING PIN

Filed Feb. 17, 1964  4 Sheets-Sheet 4

WILLIAM W. BARTON
MILTON B. HOLLANDER
JAMES A. BOLTON
INVENTORS.

BY *Arthur J. Plantamura*
ATTORNEY.

United States Patent Office 3,353,258
Patented Nov. 21, 1967

3,353,258
BOWLING PIN
William W. Barton and Milton B. Hollander, Stamford, and James A. Bolton, Darien, Conn., assignors to American Machine & Foundry Company, a corporation of New Jersey
Filed Feb. 17, 1964, Ser. No. 345,368
8 Claims. (Cl. 29—463)

This invention relates to the manufacture of bowling pins and more particularly to bowling pins clad in metal such as magnesium, aluminum or titanium.

While bowling pins comprising metal shells have been known for many years, as for example, those disclosed in U.S. Patents 1,060,932, 1,491,279 and 2,166,950, because of the inadequacies of hollow metal shells both as to weight and balance and sound control and because of the expense and difficulties involved in manufacturing and equipping metal bowling pin shells production has not been practical heretofore. In addition to the difficulties in producing the bowling pin shaped metal shell itself, it is also necessary that the shell thereafter be filled with suitable materials; this task involving adjustments in the interior of the hollow shell poses considerable difficulty. It is necessary that the filler result in an integral bowling pin of proper weight distribution and sonic quality.

In general, such pins are manufactured by the use of molds for casting or by the use of other expensive means for performing the basic entire outer shell configuration. Subsequently, the shells are machined to achieve the desired contours and to prepare the surface for receiving a plastic cover or cladding. Some means is thereafter employed, such as expanding in situ formable plastic, or pouring in a heat curable plastic composition which may contain a wood flour filler to provide proper weight distribution and sonic quality. In view of the fact that the metal shell is already preshaped, these prior means for post filling and conditioning of the interior of a preformed shell are generally very cumbersome. Serious problems are encountered not only in suitable distribution of weight but also in adhesion of the filler to the metal shell.

The object of this invention is to manufacture a metal clad bowling pin by novel methods and at substantially lower cost than presently known methods permit, yet retaining all the accepted physical characteristics, e.g. of sound, scorability, weight, bounce, etc., which are presently associated with the conventional wood bowling pins.

The invention more particularly has as its object the provision of a method, in the art of manufacturing metal clad bowling pins, of first preparing the inner core of the pin so that it is appropriately shaped in advance and has certain desired physical, mechanical and sound controlling properties and thereafter applying on said core, a metal shell or cladding.

It is a particular object of the invention to provide a method for manufacturing bowling pins comprising enclosing or encapsulating a core of proper contour, weight distribution and sound controlling characteristics within a metallic shell wherein said shell when placed over the core is oversized and thereafter is collapsed on said core to a predetermined size and contour.

Another object of the invention resides in enclosing a preformed core having a predetermined weight distribution and sonic quality in cast metal preshaped halves and securing said halves to form an integral bowling pin.

A further object of the invention resides in a method of manufacturing a metal clad bowling pin wherein the core is wrapped or wound with suitable metal strands in suitably distributed layers around the core to produce an uninterrupted metal shell of appropriately distributed thicknesses over said core.

Another object of the invention resides in the manufacture of a bowling pin comprising a metal shell over a core in which the encapsulated core is preformed and has suitable weight distribution and sonic quality and wherein the metal shell is applied on the core by accumulation or deposition such as by electrodeposition.

It is an additional object of the invention to provide a bowling pin containing a metal shell over a core in which the core is preformed and has a suitable weight distribution and sonic quality, and wherein the metal shell is cast directly over the preformed core and forms an article integral therewith.

Still another object is to provide for a suitable core materal which will remain in close contact with or adhere to the metal shell without separating in spite of the severe shocks that take place when such bowling pins are struck by a bowling ball or by each other during play.

Another object is to provide a durable metal clad bowling pin virtually indistinguishable by sound, scorability or appearance from the conventional wood bowling pin.

Additional objects and advantages will become apparent as the description of the invention progresses.

In order that the manner in which these and other objects are attained, in accordance with the invention, can be better understood, reference is made to the accompanying drawings wherein:

FIG. 1 is a cross sectional view, in vertical elevation, of a bowling pin constructed in accordance with the invention, in which a preshaped core of suitable weight distribution and sonic property is covered with a protective cladding comprising a metallic shell which is further covered with a plastic surface layer over the metal shell such as a layer of polyurethane elastomer, ethyl-cellulose or nylon.

Figure 1:
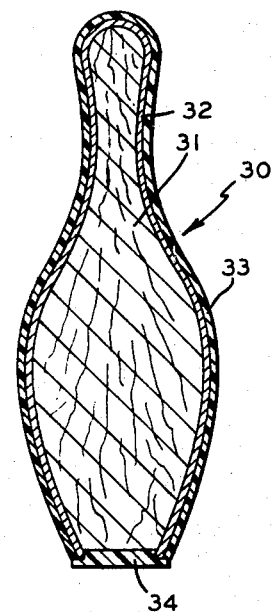

In order that the invention can be best understood, the novel method and various embodiments thereof will be described with reference to the drawings.

In accordance with the invention, highly practical means are provided for manufacturing bowling pins which comprise a metal shell. Generally the invention resides in the advantageous steps of permitting suitable shaping of the filler element before the metal shell is applied so that the inner (preferably non-metal) core will impart to the assembled pin the proper weight distribution, bounce and sonic characteristics after the metal shell is applied. It will be apparent that this sequence wherein the interior element is first prefabricated eliminates the difficulties encountered in conventional methods wherein the shell is first formed and thereafter the task of suitably introducing the inner core into the metal shell is undertaken for the purpose of providing proper weight distribution and sonic properties.

The core material enclosed within the metal shell in accordance with the invention may comprise any suitable material or combination of materials. Exemplary of the various materials which may be used is wood, either as a solid block or laminated elements, which wood may be inferior to the relatively expensive hard maple stock used in conventional wood bowling pins. Additionally the core may be sawdust or shavings suitably bonded with resinous material; plastics, either solid or cellular; inorganic materials such as vermiculite, diatomite, barytes, etc., or foamed metal material, e.g. foamed aluminum, magnesium, etc. The formation of cellulose cores are disclosed for example in pending U.S. patent application S.N. 31,161, now U.S. Patent 3,147,975. Foamed aluminum fabrication is disclosed for example in the article entitled "Foamed Aluminum" published in Modern Castings magazine of February 1959. The manufacture of wood or composition cores is well known in the art. When it is desired to cast over the core, the core used should comprise a heat resistant material such as vermiculite or other compositions capable of withstanding metal casting temperatures.

The metal shell is formed preferably so as to have variable thicknesses in order to increase its strength at the belly region as is shown for example in U.S. Patent 1,491,279. The metal shell is coated with a conventional surface layer generally incorporating a white pigment to provide the appearance normally obtained with standard plastic coated bowling pins now in use. Various coating materials and thicknesses may be utilized over the metal which include for example, ethylcellulose, nylon, polyurethane and the like. Coating systems of this kind are disclosed in U.S. patent applications S.N. 170,453 of R. A. Smith, entitled "Bowling Pin" filed Feb. 1, 1962, which was replaced by continuing application S.N. 534,946, filed Jan. 21, 1966, which was in turn replaced by continuation in part application S.N. 538,618, filed Mar. 30, 1966; and U.S. patent application S.N. 139,667 of R. A. Smith et al., entitled "Bowling Pin," filed Sept. 21, 1961, now abandoned. The pin may thereafter be equipped with any one of suitable replaceable bases of a type which provide the necessary friction quality and durability and at the same time have sufficient flexibility to prevent damage to the other pins in play. Bases of this kind, for example, are described in U.S. Patents 2,739,814 and 2,973,206.

Figure 2:
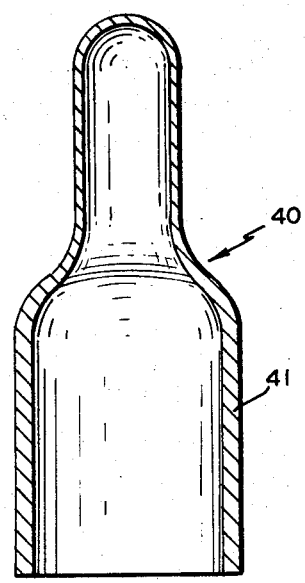
FIG. 2 is an elevational view, in section, of an oversized metal preform of the kind which may be applied over the core which has been previously preshaped and adjusted for weight and sound-control and thereafter collapsed to predetermined size on the core.
Figure 3:
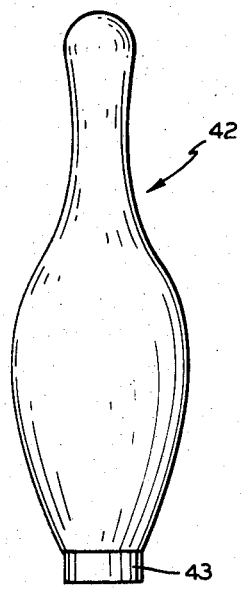
FIG. 3 is a view of a preformed core prior to applying thereon the metal cladding or shell.
Figure 4:
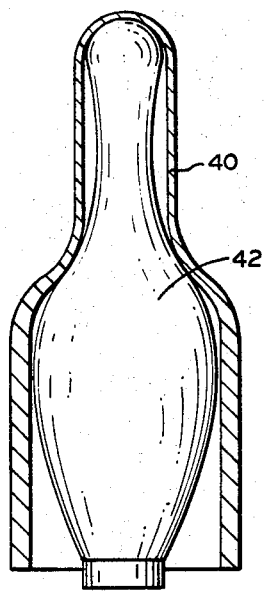
FIG. 4 is a sectional elevation illustrating the preform metal shape of FIG. 2 in position over the core of FIG. 3 before the metal is collapsed to conform to the finished bowling pin shape.
Figure 5:
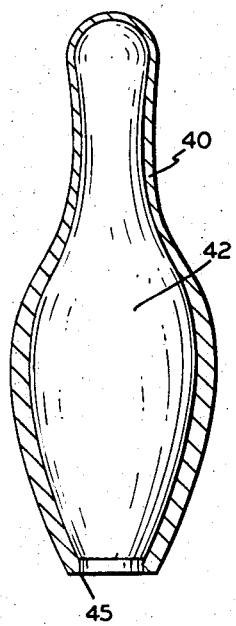
FIG. 5 is an elevational view in section showing the metal shell collapsed to shape over the core and having the base suitably cut away to receive a replaceable plastic base.

Referring to FIG. 1 of the drawing, a bowling pin 30 comprising a core 31 of suitable material is enclosed in a metal layer 32 on which is applied a plastic coating 33. The pin is equipped with a suitable replaceable base 34. In forming the pin illustrated in FIG. 1, various means hereafter discussed in detail may be employed. As illustrated in FIGS. 2–5, an oversized metal preform 40 as shown in FIG. 2 having generally thicker portion in the lower part which includes the belly region 41 is applied over a core 42 as shown in FIG. 3. It may be desirable, depending on the ultimate base configuration sought, to provide the filler element 42 with a base extension 43 so that as the metal cladding is closed thereon the desired contour is imparted to the metal contiguous to the base. Thereafter any unnecessary filler protrusion may be removed. The preform 40 is placed over the core 42, as shown in FIG. 4 and thereafter is collapsed by any suitable means such as by explosive, electrohydraulic or electromagnetic forming processes to produce a configuration wherein the metal shell is contoured to provide an integral structure over the core. The resulting product as illustrated in FIG. 5 in which the contoured preform 40 is locked over the core 42, is thereafter suitably machined at 45 to accommodate a base. The composite may then be clad with the usual plastic surface layer and base as shown in FIG. 1.

Figure 6:
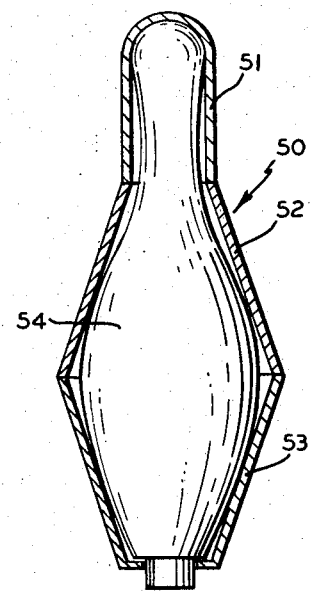
FIG. 6 is a modified oversized metal preform comprising a three-section arrangement which may be suitably assembled to contain the core and thereafter collapsed to the predetermined shape.
Figure 7:
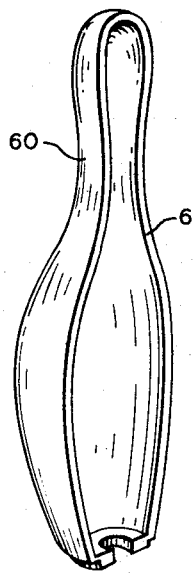
FIG. 7 illustrates a metal half, a pair of which may be placed over a preformed core of the kind shown in FIG. 3 preformed to have controlled characteristics and thereafter assembled as shown in FIG. 8 and secured over the core in permanent relationship.

The alternate metal preform 50 illustrated in FIG. 6 comprises a head portion 51 and an intermediate portion 52 and a lower portion 53. Although three segments are shown it will be apparent that two segments to form a shape substantially that of FIG. 2 may be employed. Also more than three segments may be used. Assembly of these transverse segments 51, 52 and 53 is effected by introducing therein the core 54 and joining the transverse metal segments. The intermediate portion 52 may be joined to the upper and lower portions 51 and 53, respectively, by any suitable means known in the art such as by friction welding. When this means is used, a single operation involving the rotation of the center section 52 in frictional engagement with the joining edges of sections 51 and 53 and subsequently applying simultaneous pressure engagement by the outer segments 51 and 53 on 52 at the proper interface temperature may be used to effect joinder of the sections. The technique used in friction welding is disclosed, for example, in "Development in Friction Welding" by M. B. Hollander, Metals Engineering Quarterly, May 1962, pp. 14–24.

In contouring the preform 40 or 50, on the pin core 42, or 54 respectively, it is thus seen that a metal preform of varying wall thickness or of substantially uniform thickness is placed over a bowling pin core and the preform compressed onto the core by any known pressurization means to collapse the preform, e.g. by the rapid discharge of electrical energy. The result of this operation is a long-lasting, metal-clad bowling pin of proper shape, weight, mass distribution, acoustic properties and scorability.

The metal preform of some light alloy of aluminum, titanium, magnesium or the like may be produced by spinning, deep drawing, impact extruding or some other production process. The preform is axially symmetrical, but the wall thickness varies along its length in order to provide proper weight distribution in the final pin to provide adequate strength at the ball line of the final pin and to compensate for the changes in the wall thickness due to the subsequent electromagnetic or electrohydraulic forming operation. The shape of the core establishes the outer configuration of the metal shell after the electromagnetic or electrohydraulic forming operation. An electromagnetic forming operation, which involves surrounding the assembled preform and core with an electric inductance coil, is described, for example, in U.S. Patent 2,976,907. In the case of the electrohydraulic forming operation, the preform (with the core inside) is immersed in water and a shock wave (generated by a spark discharge) compresses the preform onto the core.

Figure 8:
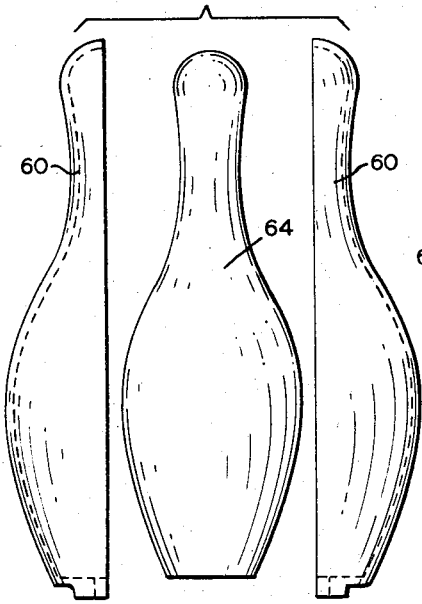

Referring to the embodiment of FIGS. 7–10, the manufacture of the pin may be effected by preforming metal pin halves 60 of suitable thickness and weight distribution and having an edge 61 formed to aid in conveniently aligning the two halves when they are positioned over an inner core 64 as shown in FIG. 8. Preferably the core 64 is formed slightly oversized so that as the metal halves 60 are forced together a tight integral structure results. If desired, an adhesive material may be employed to coat the inner surface of the halves prior to joining over the core. Any suitable means such as a press may be used to close the halves 60 over the core 64 and to join the halves e.g. as by welding as shown at 65 in FIG. 9.

Figure 9:
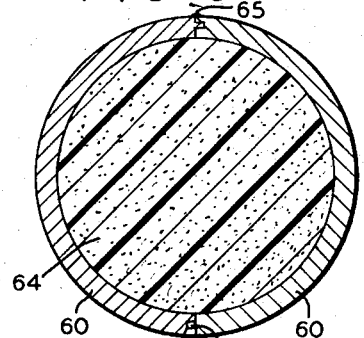
FIG. 9 is a transverse view taken at substantially the ball line of a pin assembled as described in conjunction with FIG. 8.
Figure 10:
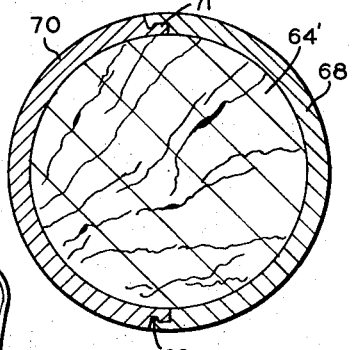
FIG. 10 is a view similar to that of FIG. 9 illustrating an alternative configuration at the assembly juncture of the two complementary halves.

As shown in FIG. 9, a tongue 66 and groove 67 arrangement is illustrated to facilitate the alignment of the halves 60. An alternate alignment and joining configuration is illustrated in FIG. 10 which comprises an interlocking edge configuration wherein metal shell half 68 is provided with an outer extending lip 69 which engages, and upon the halves being pressed together, locks with mating extension 71 formed by an inner extension of half 70. In this configuration, welding of the halves may be omitted.

In addition to welding or mechanical locking of the two half-shells, they may be brazed or otherwise bonded together before the plastic surface layer is applied. The result is a long-lasting, metal-clad bowling pin of proper shape, weight, mass distribution, acoustic properties and scoreability. After long usage, only the plastic layer is affected and when the effects are severe, it is only necessary that the plastic surface be stripped from the metal and a new surface applied to provide a bowling pin providing the life and appearance of a new pin.

The metal half-shells may be formed of aluminum, titanium or magnesium alloy as well as other metals. Shaping into the proper bowling pin configuration may be effected by stamping, deep drawing, die casting the metal or by using some other production process. The wall thickness of the half-shell varies along its length in order to provide proper weight distribution in the final pin. The wall thickness does not vary around the circumference of the shell except at the two joint lines where a joint configuration (such as tongue-and-groove, lap, scarf, etc.) is employed.

The core is made of a low-density material, such as vermiculite, with impact strength and acoustic properties appropriate for the finished product. If welding or brazing is used to secure the two half-shells together, the core must also be capable of withstanding the elevated temperatures involved in those operations.

Following attachment of the two half-shells over the core, the exterior of the metal shell is coated with a plastic layer and a plastic base is secured to the pin.

Figure 11:
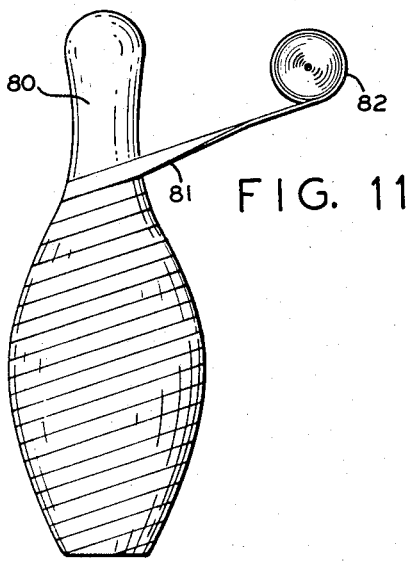
FIG. 11 is an elevational view illustrating the application of a metal strand on a preformed core.

The arrangement illustrated in FIG. 11 comprises a suitable core 80 having proper weight distribution and sound and rebound characteristics over which a metal filament or strand 81 is wound and fused or bonded in any suitable manner as from a roll 82. It will be apparent in this procedure that the strand 81 which is shown in FIG. 11 rather schematically is wound where desired in a plurality of layers to afford the requisite thickness. For example, at the belly region a relatively large number of superimposed windings would be used; whereas, at the neck and head region, there would be a lesser number of windings. A filament winding technique is described, for example, in Bulletin No. 302, Swedlow Aerospace Products, Swedlow Inc., 6986 Bandini Blvd., Los Angeles, Calif., Feb. 1, 1963. The result is a long-lasting, metal clad bowling pin of proper shape, weight, mass distribution, acoustic properties and scoreability. In this arrangement, the core 80 may be made of low density wood, such as Douglas fir; or plastic, such as cellular polyethylene or propylene and including as well other compositions. Over the core 80 metal wire or strip 81 is filament wound in such a manner that the direction of filament winding coincides with the direction of principal stresses, resulting thereby in maximum strength and stiffness. The number of alternate layers of filament winding along, perpendicularly, and at a 45° angle to the axis of symmetry of the pin is determined by the magnitude of stresses in these directions. The total number of layers of filament winding is determined by the thickness required for weight and balance of the final pin.

Figure 12:
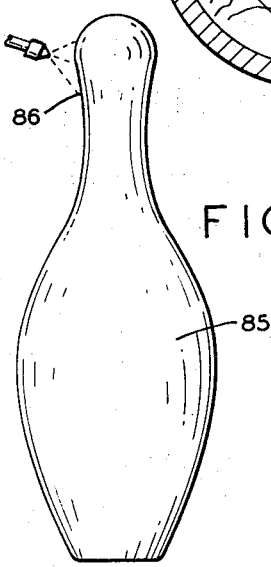
FIG. 12 illustrates an alternate embodiment wherein the metal cladding is applied to the preformed and weight- and sound-controlled core by deposition of metal on the core.

The embodiment illustrated in FIG. 12 comprises a suitable core 85 on which metal is sprayed as shown at 86 or electrodeposited to form layers of metal of an appropriate thickness in any manner known by those skilled in the art relating to deposition of metals on substrates. For example, an electrodeposition technique is disclosed in "Symposium on Electroforming—Applications, Uses and Properties," ASTM Spec. Tech. Publication No. 318, 1962, and metal spraying or metallizing procedures are described in "Recommended Practices for Metallizing," C 2.1–50, American Welding Society, Committee on Metallizing, 33 W. 39th St., New York 18, New York. The core may be preformed so as to incorporate metal or otherwise treated so as to be more receptive to metal coating. In this embodiment, the core as that described in connection with FIG. 11 may be formed of various alternate compositions.

In the case of electroforming, the surface of the core is preferably covered with a conductive coating e.g. as by spraying or dip-coating with silver, for example, a light weight foamed metal core may also be used.

Special-shaped anodes of the metal selected for electroforming may be used to control the thickness of metal deposited onto the bowling pin core although other known techniques for controlling the rate of deposition may also be employed.

Figure 13:
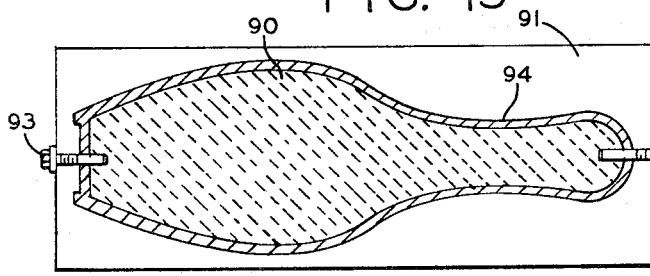
FIG. 13 illustrates a further embodiment wherein the metal cladding is cast over a preformed core of suitable weight distribution and sound quality and wherein the material forming the inner core on which the metal cladding is applied is capable of withstanding molten metal temperatures.

In the embodiment illustrated in FIG. 13, the core 90 preferably formed of a material to remain a part of the final pin and which is resistant to relatively high heats such as vermiculite or foamed metal, e.g. aluminum, is positioned in a suitable mold of conventional design 91 and secured in place by supports 92 and 93. Core prints (not shown) are preferably employed as recognized by those skilled in the art to retain the core in spaced relationship from the surface of the mold while metal is introduced into the mold around the core to form a metal shell 94. After an appropriate cooling period the molded metal shell encapsulating the vermiculite or other heat resistant core material is removed from the mold. Subsequent operations involve plastic coating the exterior of the metal shell and application of a plastic base to the pin. The weight and balance of the completed pin duplicate the weight and balance of a standard wood bowling pin.

The casting method employed may vary. For example, it may be either sand casting, permanent mold casting or die casting. The need for a removable core which is commonly used during the casting operation of this kind when forming hollow articles is eliminated due to the fact that the core is needed as a permanent part of the finished article. For sand and permanent mold casting methods, this means the elimination of manufacturing steps otherwise required to remove the expendable sand core or core shell and to subsequently fill the metal shell with a permanent core. In the case of die casting, the use of an irremovable core also drastically simplifies the machinery needed to form an integral shell.

Figure 14:
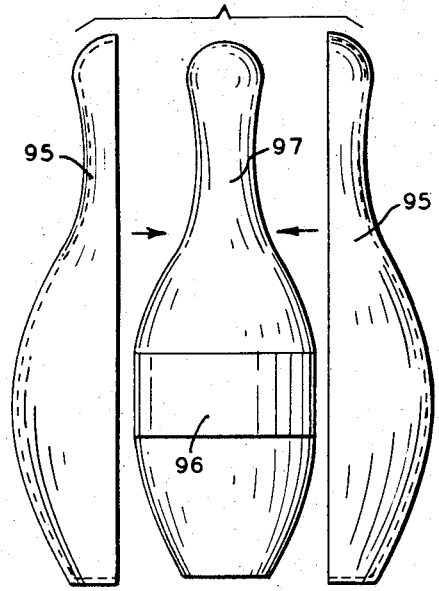
FIG. 14 is an exploded view illustrating metal halves preparatory to assembly over the filler core which is provided with a metal reinforcing shock band at the ball line region.
Figure 15:
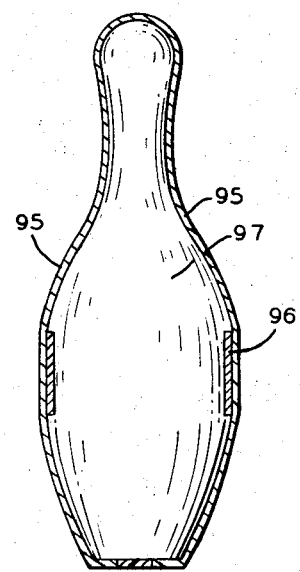
FIG. 15 illustrates a cross-sectional arrangement of the components of FIG. 14 in assembled condition.

In the embodiments illustrated in FIGS. 14 through 22, the arrangements utilize, in conjunction to the metal halves, retaining or reinforcing bands or rings in the ball line region. FIGS. 14 and 15 show metal halves 95 with the metal ball line ring or band 96 internally in said halves and placed over the core 97. In assembling, the band 96 is preferably first placed over the core 97 which comprises generally a relatively compressible material. For example, it may be placed in interference engagement on said core 96 or substantially embedded in said core. The metal halves may then be suitably joined e.g. as by welding together and/or to the ring. Alternately the vertical edges of the halves may be secured otherwise as by mechanically, interlocking, brazing, etc.

Figure 16:
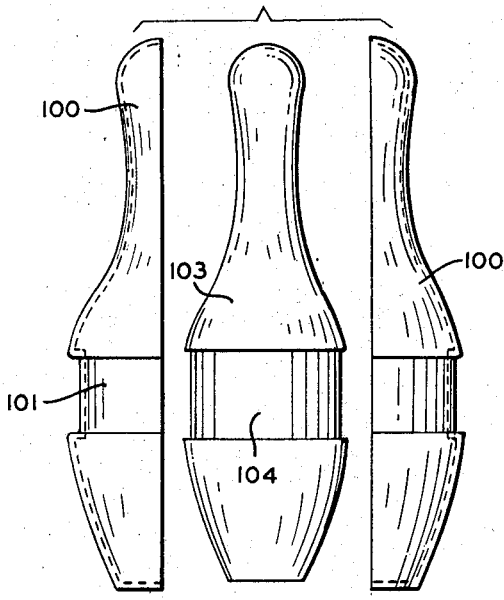
FIG. 16 illustrates still another embodiment wherein the metal halves are provided with a recess in the ball region to accommodate in the recess a retaining ring.
Figure 17:
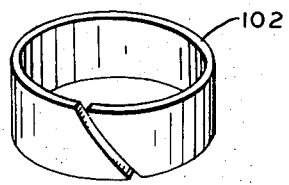
FIG. 17 illustrates a split ring which is one form of ring which may be used to retain the halves shown in FIG. 16.
Figure 19:
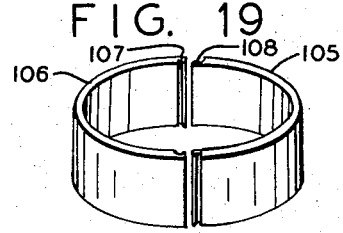
FIG. 19 illustrates one alternative variation in retaining rings comprising a two-piece interlocking band which may be used in conjunction with the arrangement of FIG. 16.
Figure 18:
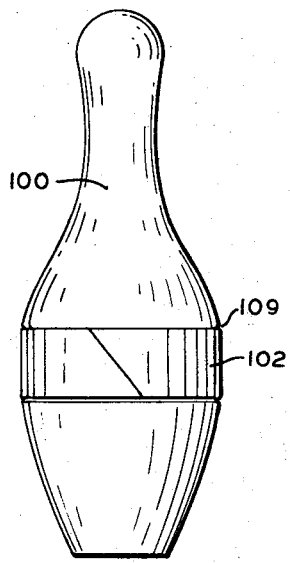
FIG. 18 illustrates the assembly of the halves of FIG. 16 with the split ring of FIG. 17.

In FIGS. 16 through 18, the metal halves 100 are provided with an external recess 101 at the ball line region to accommodate therein a retaining ring 102. The core 103 which is usually of relatively compressible material may optionally be provided with a recess 104 to match the recess 101 of the metal halves. The assembled arrangement of FIG. 16 using the split ring of FIG. 17 is shown in FIG. 18. FIG. 19 shows an alternate retaining band comprising two halves 105 and 106 constructed so as to afford a mechanical interlock at 107 and 108 when the two halves of the band are forced together thereby retaining the two halves together. In view of the usual practice of applying a heavy plastic surface or cover layer to the bowling pin, it is immaterial in the assembled arrangements that various notches or interruptions in the surface of the metal shells, such as that shown at 109 are present. These imperfections are converted to a smooth contour by filling with the plastic cover material. Such materials include for example polyurethane, ethyl cellulose or nylon, which is generally pigmented white and applied to produce the smooth, uninterrupted finish.

Figure 20:
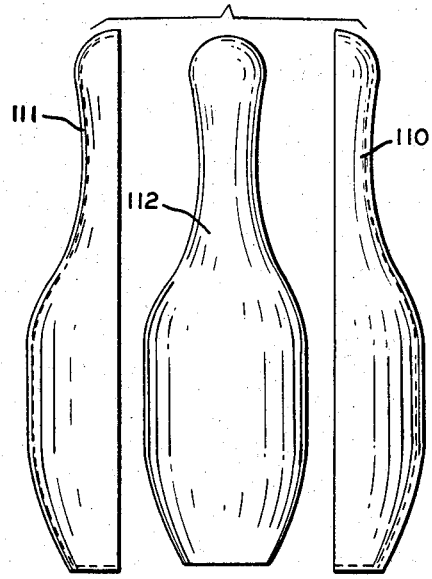
FIGS. 20–22 illustrate a further embodiment wherein the halves of FIG. 20 are held together by the cylindrical band of FIG. 21, preferably in an interference fit, to provide the assembly shown in FIG. 22.
Figure 21:
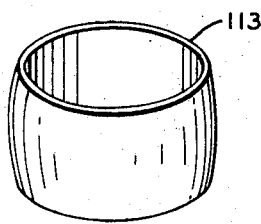
Figure 22:
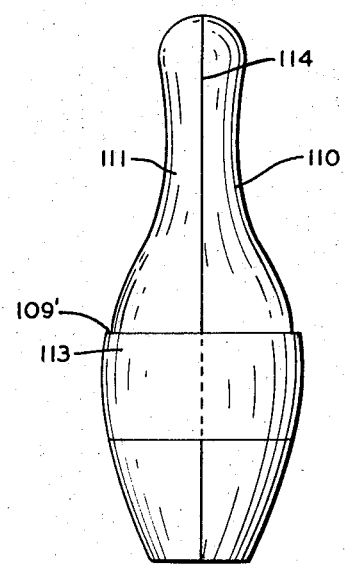

In FIGS. 20 through 22, an arrangement utilizing an external retaining and/or reinforcing band in which no recess is formed in the metal halves, is employed. Instead the metal bowling pin halves 110 and 111 are formed at the ball line region so as to accommodate in interference fit a substantially cylindrical retaining band 113 shown in FIG. 21. In assembly the halves 110 and 111 are placed over the core 112 and positioned with suitable force into a secure locking engagement, due to the interference fit, at the appropriate position at the ball line, as shown in FIG. 22. The ring 113 may be expanded by heat to aid in facilitating assembly. This arrangement for locking the assembly may be supplemented by welding along the seam 114 between the two halves and at other desired locations.

The following examples are provided as illustrative of the practice of the present invention.

EXAMPLE 1

Twenty-four metal preforms were made of magnesium alloy AZ–31B in the fully annealed condition. One end of a tube 4⅞" outside diameter having a 5/32" wall thickness was necked down by a combination of hot spinning and stretching to 2.447" outside diameter and having a 3/32" wall thickness. To the small diameter end of this tube a second tube of similar diameter and wall thickness was welded. This second tube terminated in a spun hemispherical cap. The overall length of the preform was 15½ inches.

Twenty-four cores were turned from laminated blocks of Douglas fir. The outer configuration of the core was such that when the metal preform and plastic coating were applied to the core the final configuration of the composite body was that specified by the ABC for a bowling pin. Douglas fir was selected for the core since it has relatively high impact strength and low density.

Compression of the metal preform onto the wood core was performed by surrounding the assembly with a coil and rapidly discharging stored electrical energy from a capacitor bank through the coil, thereby creating a pulsed magnetic field around the coil windings. As a result, a current was induced to flow in the opposite direction through the electrically conductive metal preform. Current induced in the preform reacted against the magnetic field [1] around the coil and winding. This produced an intense force between the coil and the preform which compressed or shrunk the preform onto the wood core. The magnesium shell was heated to a temperature of approximately 400° F. immediately prior to the forming operation.

The metal shell was then trimmed at the base of the pin. A polyurethane elastomer coating approximately 3/16 inch thick was cast over the metal shell to give the final bowling pin configuration.

The wood at the base of the pin was grooved for application of a plastic base. Application of the plastic base completed the fabrication of the pin.

EXAMPLE 2

Forty-eight metal half-shells were stamped from 0.091" thick aluminum alloy 6061 sheet. The wall thickness of the stampings was approximately uniform throughout. In order to strengthen the shell in the vicinity of the ball line and to give the pin the proper center of gravity, an aluminum shock ring was made to fit snugly inside the two half-shells when assembled. This shock ring was 1.94" long with a wall thickness of 0.174". A second aluminum ring was made to fit snugly inside the assembled half-shells at the base. A protrusion from this second ring served to secure the plastic base to the pin.

Assembly consisted of forcing the shock ring into position over a preformed vermiculite core, placing the second ring at the foot of the core, and then enclosing this sub-assembly within the two shell-halves. The two shell-halves were then welded to themselves and to the two internal rings as by spot welding. Alternately, plug welding may be used to secure the ring to the metal halves. Electron-beam and Heliarc welding were employed. The assembly was then solution treated and aged to the T6 ASTM condition.

A polyurethane elastomer coating approximately ⅛ inch thick was cast over the metal shell and a plastic base attached to the base of the metal assembly.

EXAMPLE 3

The procedure of Example 2 was substantially repeated except that instead of the internal shock ring employed therein, an external ring having a width of about 2 inches and a thickness of about 3/16 inch was utilized to fit over the assembled halves at the ball line as illustrated in FIG. 22. The components were dimensioned to provide an interference fit which required that the ring be forced over the assembled halves, i.e. the inner diameter of the ring is less than the outer diameter of the assembled halves.

EXAMPLE 4

A core was made of polyethylene. Over the core, metal wire was filament wound in such a manner that the direction of filament winding coincided with the direction of principal stresses. The number of alternate layers of filament winding along, perpendicularly, and at a 45° angle

---

[1] See International Science and Technology, Conover-Mast Publications, June 1962 issue, pp. 12–23.

to the axis of symmetry of the pin was determined by the magnitude of the stresses in these directions. The total number of layers of filament winding was determined by the thickness required for weight and balance of the final pin.

The final operation involved coating the exterior of the filament winding with a polyurethane elastomer layer of approximately ¼ inch thickness.

EXAMPLE 5

A polyethylene core was metallized with a two-step dip of stannous chloride and monomolecular silver. Electrodeposition of a nickel cladding was then performed in a sulfamic bath. A rotating split was used to guarantee uniform deposition all around the shell. Specially shaped nickel anodes were used in conjunction with auxiliary anodes and "thieves" to control the thickness of metal deposited along the length of the pin.

Subsequent operations involved ethyl cellulose plastic coating of 3/16 inch thickness on the exterior of the metal shell and application of a plastic base to the pin.

EXAMPLE 6

A vermiculite core was placed in a sand mold and aluminum alloy 386 cast around it. After removal from the mold, the aluminum was solution treated and aged to the T6 condition. A groove was machined in the base of the cast shell for subsequent application of a plastic base. The shell was coated with polyurethane elastomer and the plastic base applied.

EXAMPLE 7

Twenty-four foamed aluminum cores were cast in carbon dioxide sand molds to form cores suitably undersized to receive an outer metal shell thereon. In order to cause the aluminum to foam, zirconium hydride wrapped in aluminum foil was added to the molten aluminum and vigorously stirred about 15 seconds before casting started. The foamed aluminum cores were placed individually in a die-casting machine and aluminum alloy 360 die-cast around the foamed aluminum core.

Subsequent operations involved plastic coating of the exterior of the metal shell with a caprolactam nylon layer of approximately 3/16 inch and fitting with replaceable plastic base.

In each case the metal shell bowling pins of the invention have an average useful life at least several times that of the most durable wood bowling pins.

It will be apparent to those skilled in the art that various modifications may be made in the teaching presented without departing from the scope of the invention. Accordingly, the invention is not to be limited except insofar as necessitated by the appended claims.

What is claimed is:

1. A method of manufacturing a metal clad bowling pin which contains a filler element within the metal cladding comprising selecting a filler element which is to be an integral part of the finished bowling pin said filler element having generally the shape of a finished pin and including a circumferential belly at the ball line region and having a predetermined weight distribution and sonic quality, enclosing said filler element in preshaped complementary metal halves closely similar in size and shape to said filler element and securing said halves along a joint formed at the vertical medial plane and thereby engaging said metal halves with said filler element in permanent close fitting engagement.

2. The method of claim 1 wherein the metal halves are provided with a strengthening band at the ball line region.

3. The method of claim 2 wherein said band is secured contiguous and internal to said halves.

4. The method of claim 2 wherein said band is secured contiguous and externally to said halves.

5. The method of claim 4 wherein the band comprises an interference fit on said halves.

6. The method of claim 4 wherein said halves are provided with a recess at the ball line region to accommodate said band.

7. The method of claim 1 wherein said metal halves are made from a metal selected from the group of materials consisting of aluminum, aluminum alloys, titanium, titanium alloys and magnesium alloys.

8. The method of claim 1 wherein said filler element comprises a material selected from the group of materials consisting of wood, foamed metal, vermiculite, wood particles bound together by a resinous material, and polyethylene.

References Cited

UNITED STATES PATENTS

| 157,867 | 12/1874 | Pollard | 29—515 |
|---|---|---|---|
| 303,222 | 8/1884 | Grom | 29—505 X |
| 2,146,381 | 2/1939 | Rheem. | |
| 2,328,338 | 8/1943 | Hauptman. | |
| 2,944,821 | 7/1960 | Mason | 273—82 |
| 3,085,316 | 4/1963 | Nelson | 29—155.63 |
| 3,138,380 | 6/1964 | Satchell | 273—82 |
| 3,141,236 | 7/1964 | Dunne | 29—517 X |

WILLIAM I. BROOKS, *Primary Examiner.*